US006755155B2

(12) United States Patent
May

(10) Patent No.: US 6,755,155 B2
(45) Date of Patent: Jun. 29, 2004

(54) HORSE TRAILER

(76) Inventor: Nancy May, 145 W. 799 South, Nephi, UT (US) 84648

( * ) Notice: Subject to any disclaimer, the term of this patent is extended or adjusted under 35 U.S.C. 154(b) by 0 days.

(21) Appl. No.: 10/176,784

(22) Filed: Jun. 24, 2002

(65) Prior Publication Data

US 2003/0233987 A1 Dec. 25, 2003

(51) Int. Cl.$^7$ ............................... B60P 3/04; B62B 9/14
(52) U.S. Cl. ........................ 119/400; 280/851; 296/198
(58) Field of Search ................................ 280/851, 847, 280/849; 296/180.1, 180.4, 181, 182, 198, 199, 37.2, 37.3; 119/400, 405

(56) References Cited

U.S. PATENT DOCUMENTS

| | | | | |
|---|---|---|---|---|
| 1,893,975 A | * | 1/1933 | Jackson | 267/164 |
| 2,141,140 A | * | 12/1938 | Johnson | 280/851 |
| 3,053,224 A | * | 9/1962 | Pierce | 119/400 |
| 3,388,884 A | * | 6/1968 | Eggler et al. | 248/222.11 |
| 3,574,388 A | * | 4/1971 | Stone | 296/168 |
| 4,159,142 A | * | 6/1979 | Larson | 296/24.2 |
| 4,417,741 A | * | 11/1983 | Ciocan | 280/851 |
| 4,732,419 A | * | 3/1988 | Ketterer et al. | 296/26.07 |
| 4,735,428 A | * | 4/1988 | Antekeier | 280/154 |
| 4,842,316 A | * | 6/1989 | Lerma et al. | 296/22 |
| 5,513,595 A | * | 5/1996 | Chatterton | 119/412 |
| 5,769,478 A | * | 6/1998 | Vernese | 296/24.2 |
| 5,967,553 A | * | 10/1999 | Cominsky | 280/847 |
| 6,007,102 A | * | 12/1999 | Helmus | 280/849 |
| 6,116,628 A | * | 9/2000 | Adrian | 280/154 |
| 6,382,675 B1 | * | 5/2002 | Furuse et al. | 280/847 |
| 6,460,892 B1 | * | 10/2002 | Barr et al. | 280/847 |
| 6,499,783 B1 | * | 12/2002 | Husted | 296/24.2 |
| 6,533,323 B1 | * | 3/2003 | Weaver | 280/847 |

\* cited by examiner

Primary Examiner—Thomas Price

(57) ABSTRACT

A horse trailer having a cover plate releasably secured to a fender such that the cover plate will provide a shield extending downwardly from the fender to cover the wheel well area and wheels against pawing and kicking of horses tied to the side of the trailer and extending upwardly from the fender to provide a support for an animal feed trough.

7 Claims, 6 Drawing Sheets

HORSE TRAILER

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Figure 1:
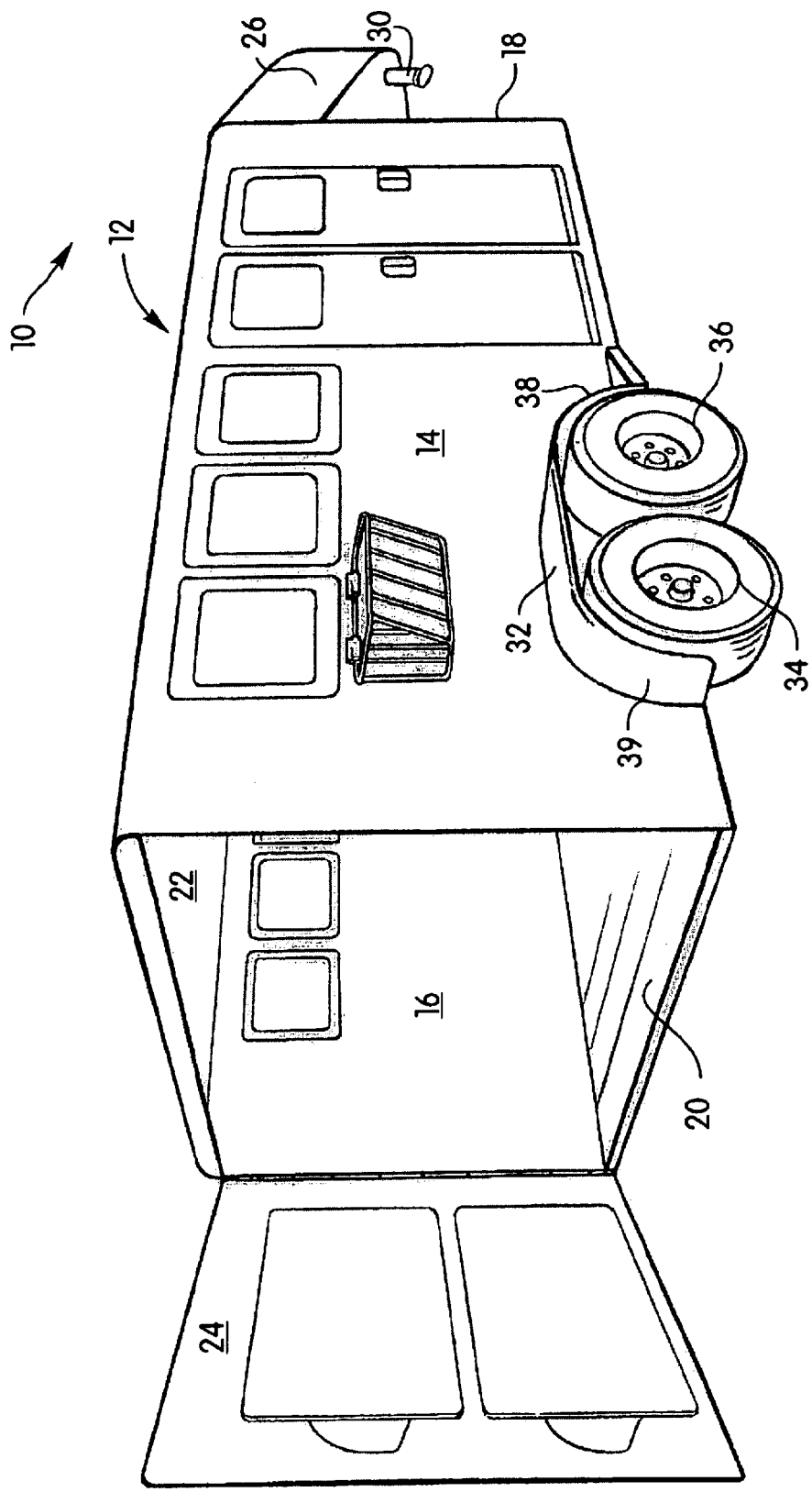

This invention relates to horse trailers and is particularly related to such trailers that will provide protection against injury to horses tied to a side of the trailer when the horse(s) are out of the trailer.

BRIEF SUMMARY OF THE INVENTION

It is common, when transporting horses in a trailer, to stop periodically to allow the horses to have a break outside the trailer. It is also common that when horses are transported in a trailer away from home that they are tied to the trailer after removal from the trailer. This may be just to keep the horses in a desired location for a short period of time, or even during feeding and watering of the animals. At rodeos and horseshows horse trailers are frequently used as a home base prior to and after events in which the horses participate. The horse trailers become convenient meeting spots, locations for leaving horses to be used at a later time and locations for feeding, watering and otherwise caring for the animals.

Often, buckets of feed or feed troughs and water containers are carried by horse trailers and are filled and used by the animals, as required.

In any event for safety purposes, horses tied to a transport trailer remain tied to a stopped tow vehicle generally to one side of the trailer that is away from passing traffic. If tied to the rear of a trailer connected to a stopped tow vehicle or to the side of the trailer adjacent to passing traffic the animal may be in danger from passing traffic. If tied between the trailer and a towing vehicle there is usually little room for the animal because of the trailer tongue connection between the trailer and vehicle.

Even when tied to the safest side of a trailer, however, horses often tend to paw at the trailer wheels and other trailer sub-structure. It is recognized that such pawing can result in injury to the leg of the animal. It is not uncommon that the horse will insert a hoof and fore leg into the wheel space formed beneath a wheel fender and have the leg caught between wheels or between a wheel and fender structure. Once caught the animal becomes panicky and in attempts to free the leg does significant scraping of the leg, or even worse, damage to ligaments or tendons of the leg.

It has also been found that some horses, when tied to the side of a horse trailer, will turn and kick at the wheels of the trailer. Obviously, such horses are also subject to injury of a foot or leg that might get caught between wheels or between wheels and metal components of a wheel well.

Principal objects of the present invention are to provide a horse trailer that will provide for feeding and watering of a horse on the "safe" side of the horse trailer. Other objects are to provide a horse trailer having cover means for the "safe side" wheel area of a horse trailer that will prevent injury to an animal that might otherwise insert a hoof and/or foreleg into a wheel area to be caught and possibly damaged.

Principal features of the invention include a horse trailer having the usual box in which horses are placed to be transported; the usual undercarriage to support the box; the usual wheels mounted to the undercarriage at opposite sides of the box; a tongue with a hitch thereon projecting forwardly of the undercarriage; and fenders projecting from the box to overlie the tops of the wheels and curved downwardly at both front and rear of the wheels to provide protection for the wheels and to limit the extent to which rocks and the like are thrown upwardly from the ground by the wheels during travel of the trailer. In addition, the horse trailer of the invention includes means on at least one fender to securely bold feed and water troughs that are removably positioned on the fender and attachment means to secure a protective cover to an outside edge of the fender so that the cover will greatly restrict access to the wheel or wheels of the trailer at the side of the trailer box to which the protective cover is applied, The protective cover is preferably made of a high density, durable plastic material that will resist denting or that is resilient enough that it will resume its shape after being struck by a horse foot.

Mounting means on the trailer support the protective cover when the cover is not in use.

Additional objects and features of the invention will become apparent from the following detailed description, drawings and claims.

THE DRAWINGS

Figure 2:
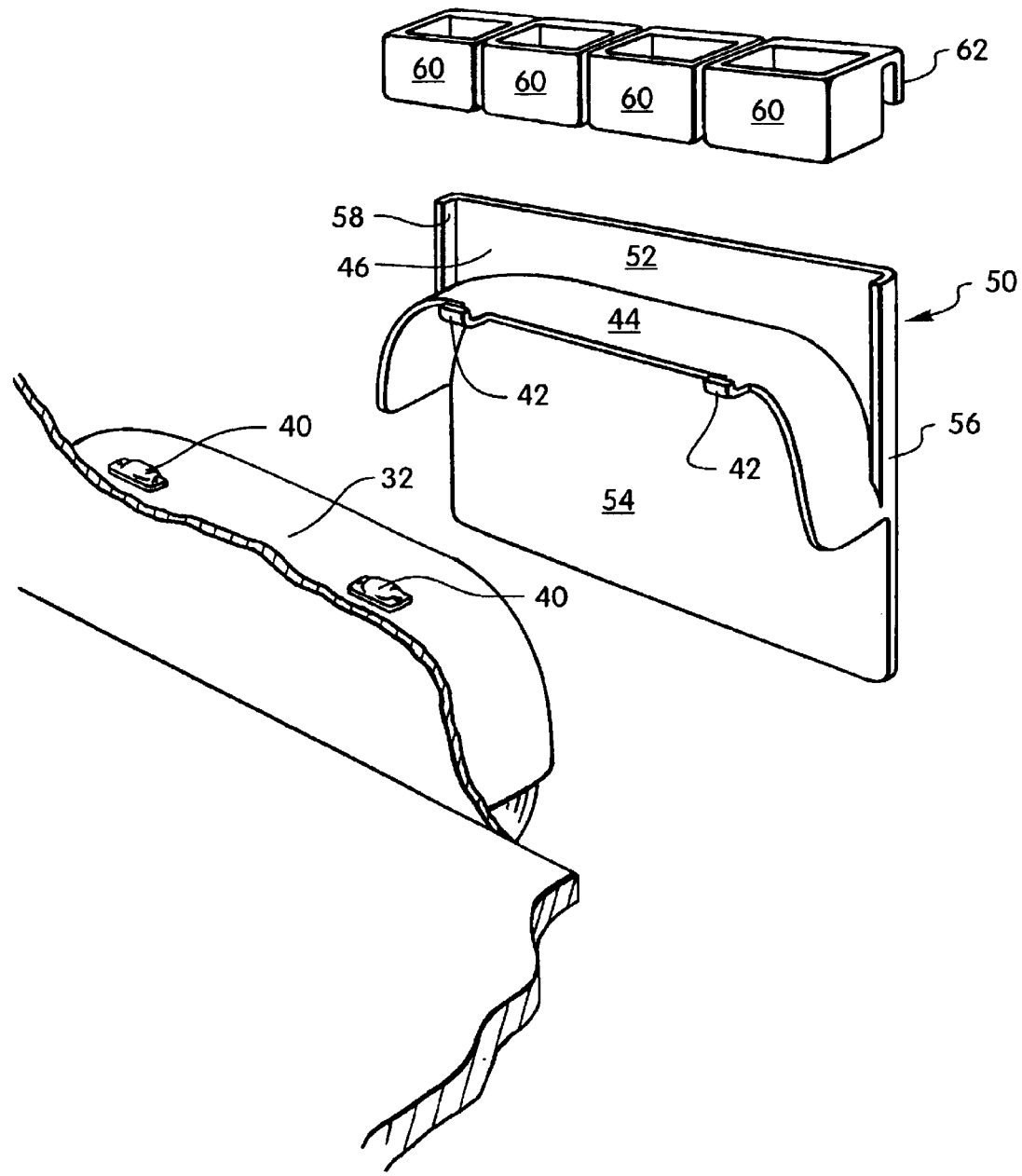
Figure 3:
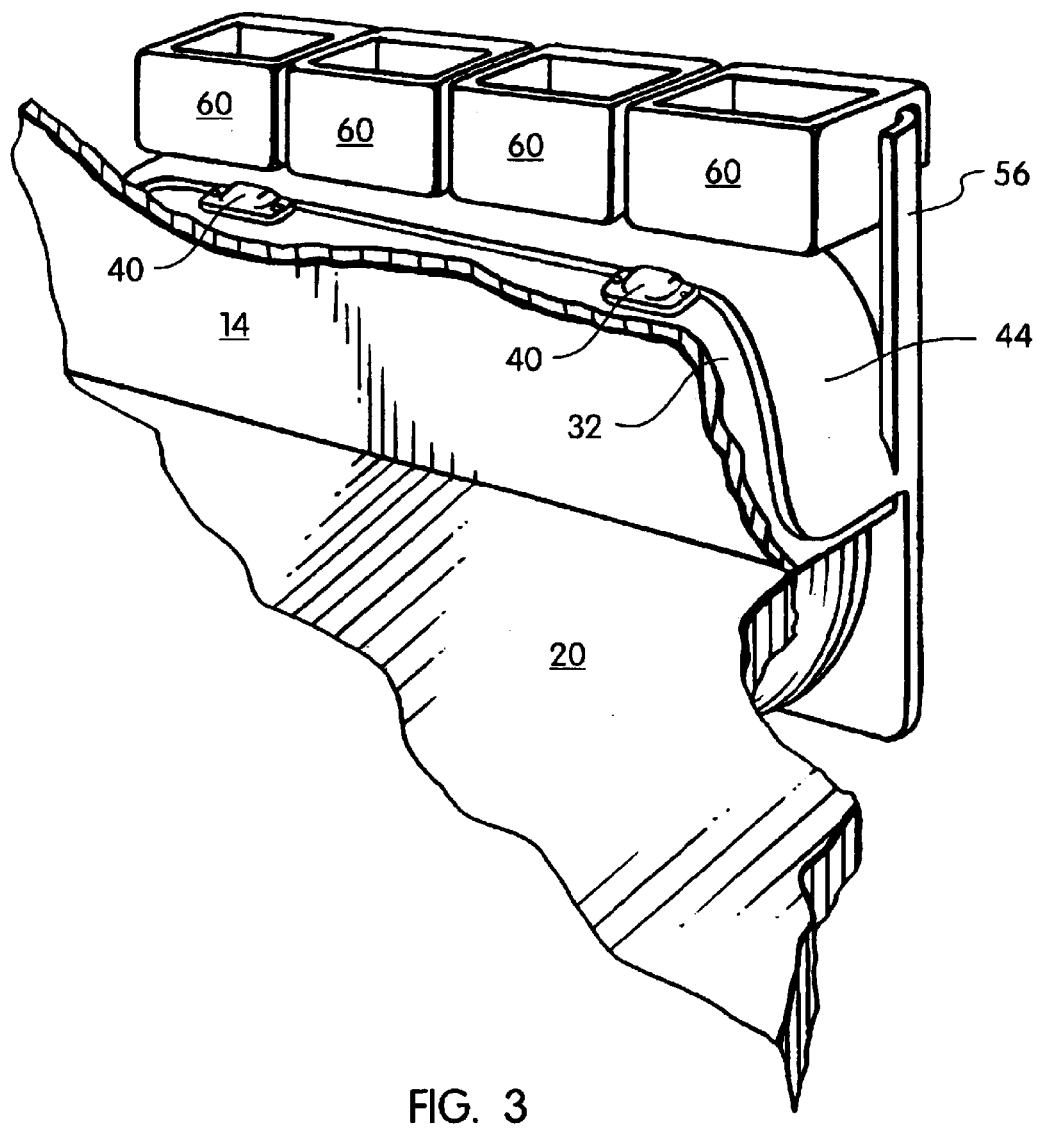
Figure 4:
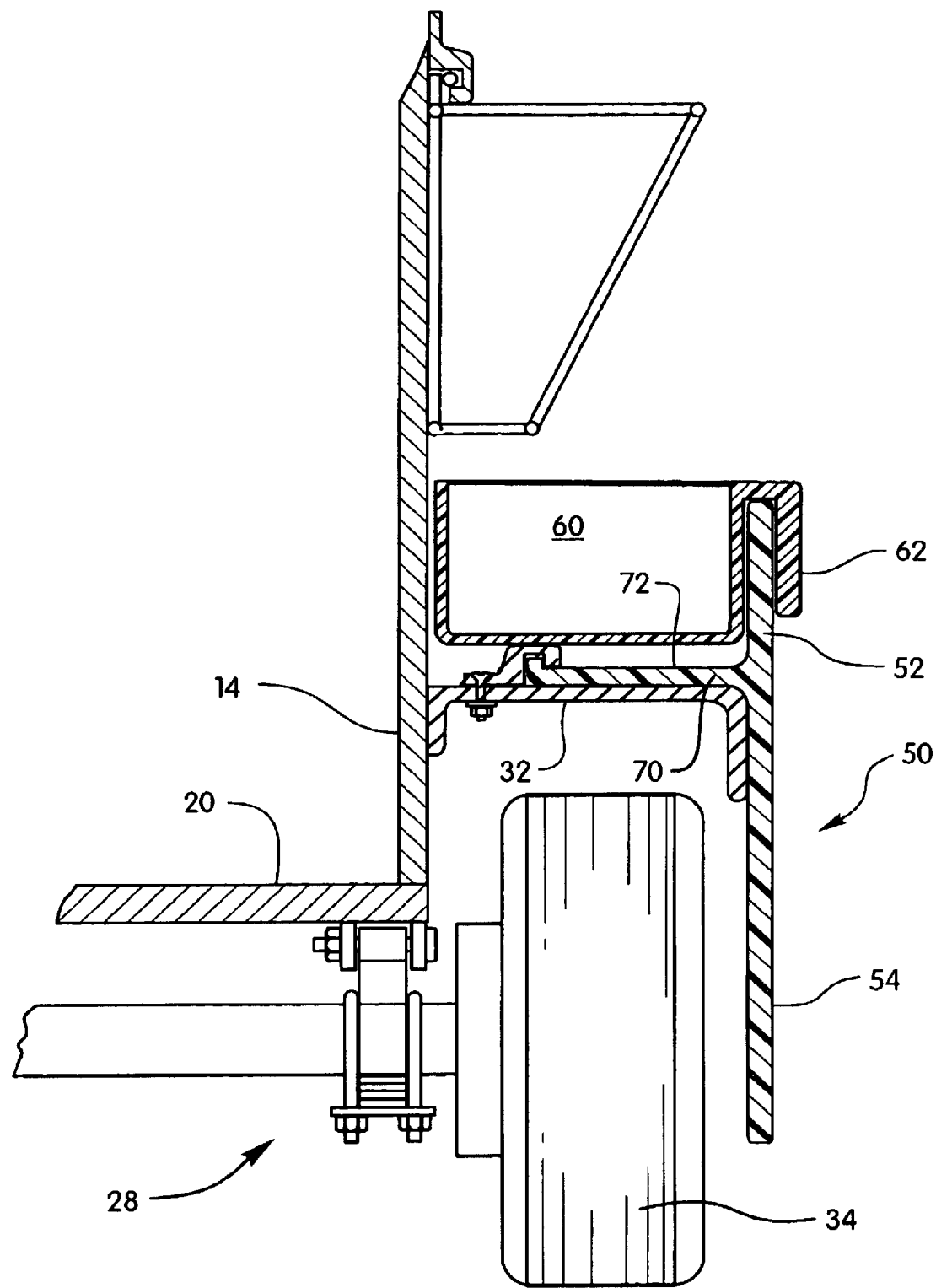
Figure 5:
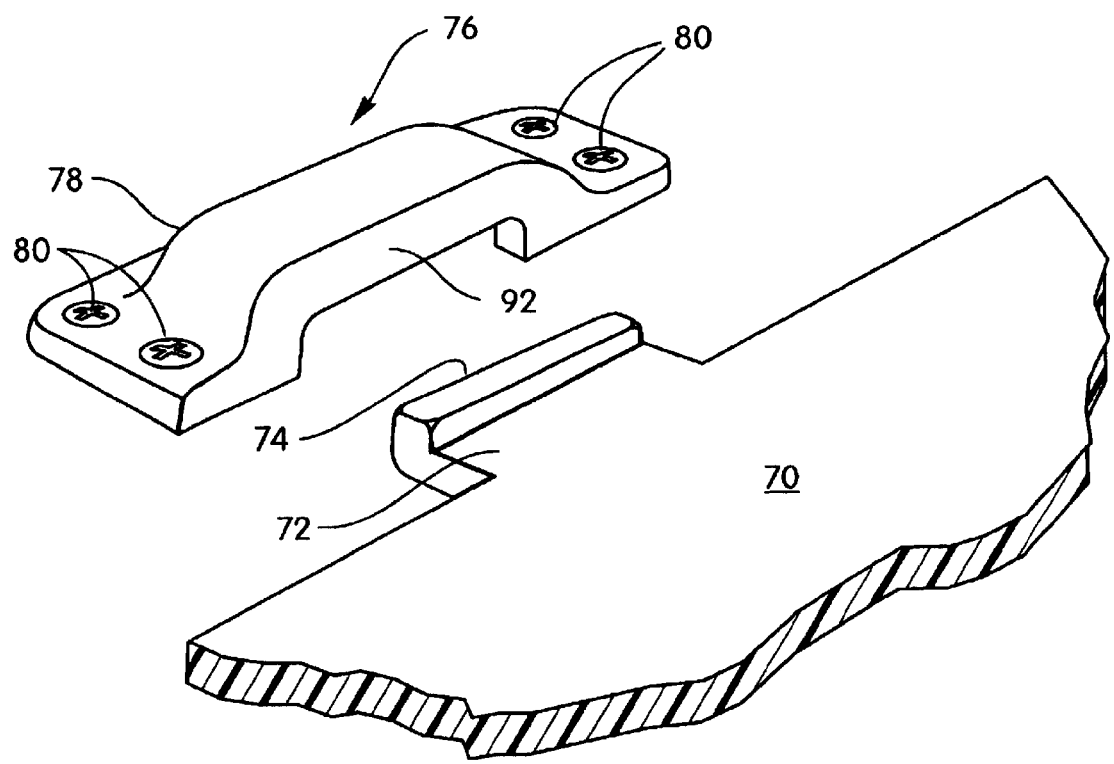
Figure 6:
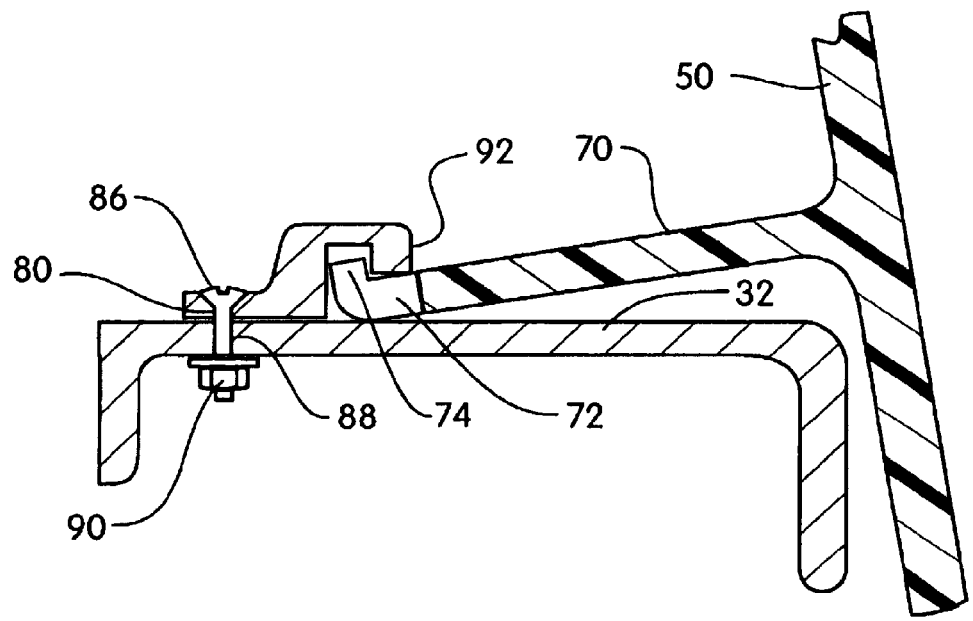
Figure 7:
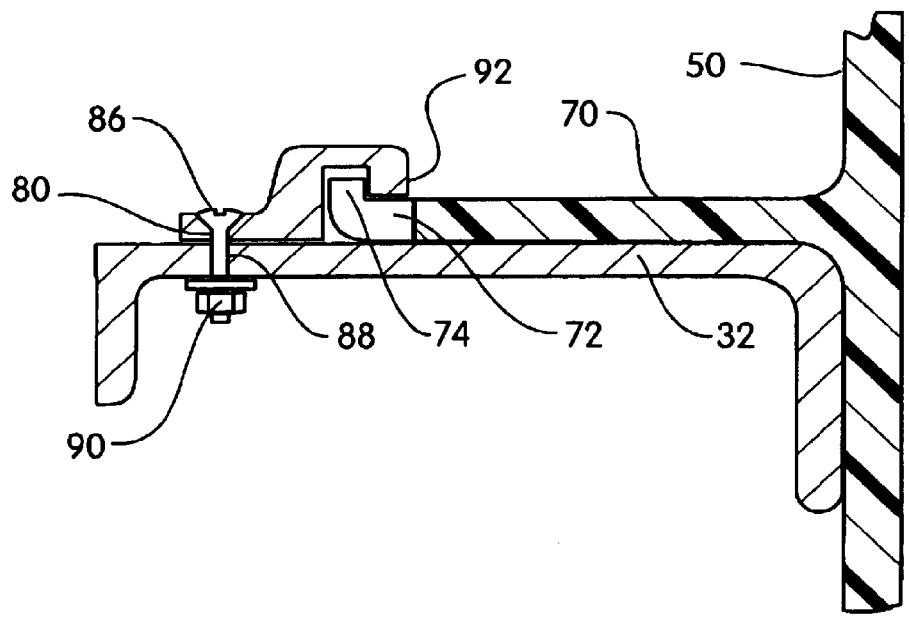

In the drawings:

FIG. 1 is a perspective view of a conventional horse trailer and is identified with the legend (PRIOR ART);

FIG. 2, a fragmentary, fragmentary, exploded view of a wheel well of a trailer of the invention and showing front views of feed and water troughs exploded from the fender and attachment means for securing a protective cover to an outer face of the fender;

FIG. 3, a perspective view of the trailer box (shown fragmentarily), with back views of the feed and water troughs positioned above the fender;

FIG. 4, an enlarged vertical section view taken on the line 4—4 of FIG. 3, but showing another embodiment of connector means for securing the protective cover to the trailer fender;

FIG. 5, an enlarged view of the connection between fender and protective cover, with the protective cover shown exploded from the fender connector member;

FIG. 6, an enlarged cross section taken within the line 6—6 of FIG. 5, but showing the protective cover being tilted into connection with the fender connector member; and FIG. 7, a view like that of FIG. 6, but showing the protective cover fully connected to the fender.

DETAILED DESCRIPTION

Referring now to the drawings:

In the illustrated preferred embodiment, the horse trailer of the invention includes a conventional horse trailer such as is shown at 10, FIG. 1. The conventional horse trailer is identified as (PRIOR ART) and has a box 12 in which horses are secured for travel. The box includes spaced apart side walls 14 and 16, and a front wall 18. A bottom 20 supports the spaced apart side walls and the front walls and a top 22 interconnects the upper edges of the side walls and front wall. A hinged door 24 swings into engagement with the side walls to close the box. A tongue 26 projects from the front wall and is securely attached to the undercarriage 28 (FIG. 4). Tongue 26 has a fifth wheel attachment connector 30 projecting from the end of the tongue remote from the box 12 to be connected to a tow vehicle (not shown) for the trailer.

The horse trailer 10 further includes a fender 32 projecting outwardly from a side wall and over the tops of a pair of tandem wheels 34 and 36. The fender 32 is curved downwardly at front 38 and rear 39, to partially cover the ground engaging surfaces of the wheels 34 and 36, respectively. In the past it has become common for horses to be tied to the fender and not uncommon for the horses to injure themselves by pawing at or kicking at the wheels.

The horse trailer of the invention further includes spaced apart slots 40 formed through the fender 32 adjacent to the side wall 12 (FIG. 2) to receive corresponding hooks 42 formed on a mounting plate 44. Mounting plate 44 is shaped to generally fit over the fender 32 and when hooks 42 are inserted into slots 40 the mounting plate 44 rests on and is secured to the fender 32. Mounting plate 44 projects from a rear face 46 of a flat protective cover, shown generally at 50.

Protective cover 50 extends at 52 above the mounting plate 44 and below the mounting plate 44 at 54. Spaced limit stops 56 and 58 are affixed to opposite ends of the mounting plate 44 and to the portion 52 of protective cover 50.

One or more (here shown as four) feed and/or water troughs 60 are dimensioned to fit snugly between the spaced limit stops and to rest on the mounting plate 44 when lips 62 projecting from front faces 64 of the troughs 60. Feed and/or water placed in the troughs is then readily accessible to horses tethered to the side of the trailer adjacent to the wheel area.

The portion 54 of protective cover 50 extends below fender 32 to provide a protective shield for the wheel well in which the wheels 34 and 36 are located beneath the fender 32.

In the embodiment of protective cover 50 shown in FIGS. 4–7 the attachment means for securing the protective cover to fender 32 has a mounting plate 70 that will overlie the fender 32 and that is removably attached to the fender 32 by spaced apart arms 72 projecting from the mounting plate 70. The arms 72 are each curved upwardly at the ends thereof to form an upturned lip 74. Receptors 76 are spaced along the edge of the fender 32 adjacent to the side wall of the trailer, to be aligned with the arms 70.

Each receptor 76 includes an elongate body 78 with spaced apart holes 80 at opposite ends and thereof. Bolts 86, inserted through the holes 80 and through holes 88 through the fender 32 are secured by nuts 90 to hold each receptor to fender 32. The body 78 is raised between the ends and and has a downturned flange 92 formed at the side of the receptor opposite the sidewall of the trailer.

As best shown in FIGS. 6 and 7, a protective cover 50 having arms 72 is secured to fender 32 by lifting the protective cover and inserting the lips 74 angularly beneath the flanges 92 and then lowering the protective cover to allow the lips to engage the flanges and the mounting plate 70 to rest on the fender 32. When the receptors are spaced along fender 32 the feed and/or water troughs rest on the receptors (FIG. 4).

The protective cover 50 is preferably stored inside the box 12 when not in use. A preferred storage location is hanging on the inside wall of door 24. Conventional support brackets (not shown) may be used to hold the protective cover to the door. Similarly, the feed/water troughs 60 may be hooked over a support rail (not shown) at the front of the trailer, for storage and to provide feed/water to the horses placed in the trailer during travel.

The protective cover 50 is made of a strong, durable rigid or semi=rigid, lightweight material that can withstand the pawing and kicking of a horse tied to the trailer while being light enough to permit easy installation, removal and storage.

Although preferred embodiments of my invention have been herein disclosed, it is to be understood that the present disclosure is by way of example and that variations are possible without departing from the subject matter coming within the scope of the following claims, which subject matter I regard as my invention.

I claim:

1. A horse trailer with
a box having spaced apart side walls, a front wall, a floor interconnecting said spaced apart walls and front walls, a door providing closure between said spaced apart side walls at an end of said trailer spaced from and opposite said front wall, an under carriage supporting said box, a tongue fixed to and projecting from said undercarriage, a hitch fixed to said tongue and at least one wheel on each side of said box, under a fender, each said wheel being mounted to said under carriage; and the improvement comprising
a protective cover assembly for each said wheel at one side of said box, said protective cover assembly including
a mounting plate overlying said fender;
means releasably securing said mounting plate to said fender; and
a protective cover extending downwardly from said mounting plate and across said wheel at said one side of said box to adjacent a bottom of each said wheel at said one side of said box.

2. A horse trailer as in claim 1, wherein
said means releasably securing said mounting plate to said fender comprises spaced holes through said fender at a side of said fender adjacent to a side wall of the trailer and corresponding hooks projecting from said mounting plate at a side remote from said protective cover and through said spaced holes, whereby said mounting plate rests on said fender.

3. A horse trailer as in claim 1, wherein
said means releasably securing said mounting plate to said fender comprises spaced apart arms projecting from the mounting plate and upwardly curved lips on the end of the arms remote from the protective cover; and a receptor for each said arm, said receptor being secured to said fender and including a raised portion with a downwardly extending lip to be engaged by the lip at the end of an arm.

4. A horse trailer as in claim 1, wherein
the protective cover has a portion extending upwardly above the fender and further includes at least one feeder trough extending between said protective cover and the wall of said trailer and a hook projecting from each said trough to hook over a top edge of said protective cover.

5. A horse trailer as in claim 4, wherein
elongate stops are fixed to said protective cover and extend upwardly from the mounting plate at opposite ends of the feed trough array.

6. A horse trailer as in claim 1, wherein
the protective cover is made of a lightweight durable material.

7. A horse trailer as in claim 6, wherein
the protective cover is made of a plastic material.

* * * * *